2,895,839

METHOD OF INCORPORATING TITANIUM INTO SELECTIVELY TRANSPARENT SILICA GLASS

Henri J. C. George, Paris, France, assignor to Quartz & Silice S.A., Paris, France, a corporation of France No Drawing. Application May 14, 1956
Serial No. 584,444

Claims priority, application France May 26, 1955

2 Claims. (Cl. 106—52)

This invention relates to selectively transparent vitreous silica product and provides a process of making the same. The product is characterized by being substantially totally transparent to light waves having a wave length of 2537 Angstron units (A.U.) while being almost totally opaque to radiation having a wave length of 1850 A.U.

Vitreous amorphous silica, or "silica glass," is widely used in applications which take advantage of its properties of being transparent to ultra-violet radiation, of having an extremely low coefficient of thermal expansion, and of being able to withstand temperatures as high as 1500° C. or more. A typical use is for the envelope for sterilizing lamps designed to emit sterilizing radiation of wave lengths in the region of 2537 A.U. A disadvantage of many such lamps arises however from their generation of radiation also in the region of 1850 A.U. which has the effect of converting atmospheric oxygen to ozone.

The present invention provides an improved process for making a silica glass which is substantially opaque to this latter radiation while being substantially totally transparent to the longer waves which are desired. The silica glass of this process is, moreover, characterized by being free of an absorption band in the infra-red region at 2.76 microns. Thus, sterilizing lamps employing an envelope of the silica glass of this invention do not result in the troublesome effects of ozone formation.

In general the silica glass of the process of this invention consists of substantially pure vitreous silica in combination with a small amount of titanium oxide, together with which the silica is fused. According to this invention the titanium oxide is incorporated by adding a solution of titanium salt to granulated pure silica (e.g. quartz) preliminary to its fusion to silica glass, and then adding a volatile base to precipitate titanium hydroxide. The granulated silica is then dried and fused.

The amount of titanium oxide necessary to attain this desired selective transparency need be only about .0001 mole per mole of silica, but much larger amounts may be used so long as the transparent character of the silica glass is maintained. An optimum amount is about .0005 mole of titanium oxide per mole of silica.

In preparing the silica glass according to the process of this invention, quartz is typically the beginning material. It is prepared for fusion by crushing and screening to particles between about 60 and 200 mesh (Tyler series) distributed to give optimum packing. The crystal particles are initially washed thoroughly and are then mixed with a solution of a titanium salt in an amount equivalent to the desired final amount of titanium oxide. A base is then added to the crystal-salt mixture to precipitate out titanium hydroxide, and the by-products of the precipitation are removed. If a volatile base, such as ammonia, is used to precipitate the titanium hydroxide, and if the acid component of the titanium salt forms a volatile salt with the volatile base, the reaction by-products may be volatalized from the silica-titanium oxide mixture. Otherwise, other procedures are used to remove the reaction by-products, e.g. repeated washings or dialysis.

The silica-titanium hydroxide mixture is finally fused and cooled to form the vitreous silica product and for that purpose the procedure described in the copending application of Henri George, Serial No. 516,560, filed June 20, 1955, may be advantageously used.

The preferred manner of practicing this invention is described in detail in the following example.

Quartz crystals are initially ground and screened to yield a starting material of between 50 and 200 mesh with the following size distribution:

| | Percent by weight |
|---|---|
| 50–80 mesh | 45 |
| 80–120 mesh | 30 |
| 120–200 mesh | 25 |

The granulated crystals are rinsed with conc. (35%) hydrochloric acid, rinsed repeatedly in distilled water until no trace of acid remains, and are then dried.

The titanium salt solution is prepared by first dissolving 15% by weight of titanium chloride, $TiCl_3$, C.P. grade, in distilled water to which is added hydrochloric acid (C.P. grade) in an amount sufficient to prevent precipitation of titanium hydroxide. This solution is prepared for use by diluting to a concentration of 0.12% titanium chloride. The diluted (0.12%) titanium chloride solution is added to the dried pure quartz crystals in an amount of 225 cc. of solution per kilogram of crystals and the two are thoroughly mixed, preferably by using a rod of silica glass. This amount of solution is such as will substantially fill the interstitial voids in the crystals without leaving a supernatant layer.

Titanium hydroxide is now precipitated among the crystals by adding 30 cc. of a 10% by weight solution of ammonia per kilogram of crystal, and mixing it thoroughly until the mixture appears absolutely uniform throughout. The crystals are now dried, re-screened (to break up lumps which may have formed) e.g. through a nylon screen having 22 meshes per inch, and fused.

Titanium hydroxide is believed to be formed by the reaction of the aqueous ammonia solution with titanium chloride according to the following reaction:

$$TiCl_3 + 3NH_4OH \rightarrow Ti(OH)_3 + 3NH_4Cl$$

Fusion is preferably carried out under a vacuum in an electric induction furnace, such as in the manner described in the above identified copending application Serial No. 516,560, filed June 20, 1955. According to this procedure a charge of about 15 pounds of the crystals is placed in a graphite crucible within the furnace, and the furnace is evacuated to a pressure of less than 1.5 mm. Hg. The power to the furnace is controlled so that the temperature of the charge rises rapidly to about 375° C. in the course of about one-half hour, and then more slowly so that the melting point of about 1750° C. is attained after about five and one-half hours. The vacuum is maintained throughout this heating period with a slight rise in pressure occurring near the end of the fourth hour, due to the vaporization of silica granules, and with the pressure reaching about 2.5 mm. Hg when the melt is complete. At this point the power supply is turned off, the pump is disconnected, and the crucible with the silica glass ingot contained therein is placed in a bucket and completely covered with sand in order to provide relatively slow cooling. When the ingot is cooled and the crucible is broken away and the surface of the ingot is sand blasted to remove from its surface any impurities that have lodged there. The ingot is then ready to be placed in a drawing furnace for conversion into desired shape.

For instance the silica may be processed into tubing, vessels or other articles in conventional manner.

The product obtained after the fused mass has cooled is a vitreous, clear, transparent glass-like material which is completely transparent to ultra-violet radiation in the region of 2537 A.U. while, unlike ordinary silica glass, being non-transmissive of shorter rays in the region of 1850 A.U. By analysis it will be found to contain titanium in an amount of .015% expressed as $TiO_2$. To the naked eye the silica glass exhibits a slight visible mauve tint which may be seen best through a substantial distance of the glass, as at the cut edge of a drawn tube. After prolonged heating the mauve tint will frequently appear greyish. The product is ideally suited for use as the envelopes of sterilizing lamps where radiation in the region of 2537 A.U. is particularly desired to the exclusion of shorter rays.

Although described with particular reference to the preferred embodiment it is contemplated that obvious modifications of the details will occur to those skilled in the art and that such may be made without departing from the scope of this invention. For instance, other soluble titanium salts may be used, as may other bases for causing the precipitation of titanium hydroxide. It should be borne in mind, however, that the silica going into the product should be substantially pure and that all other material except titanium hydroxide should be removed from the product. The glass produced by the process of this invention has been described as being particularly useful in forming envelopes for sterilizing lamps but it will be understood that it may be used generally where ozone generating radiation is desirably avoided, such as in the lamps used for blueprinting.

Having thus disclosed my invention and described in detail a preferred embodiment thereof, I claim and desire to secure by Letters Patent:

1. In the preparation of selectively transparent silica glass by heating to about 1750° C. and then cooling a mixture consisting of substantially pure silicon dioxide and titanium dioxide in an amount effective to render the glass substantially opaque to light radiation of 1850 A.U. while being transparent to radiation of 2537 A.U., the method of incorporating the titanium into the silicon dioxide prior to heating comprising mixing an aqueous solution of a water-soluble titanium salt with a mass of silica particles in an amount to substantially fill the voids between said particles, adding a base to said mixture effective to precipitate titanium hydroxide, removing the by-products from said precipitation, and drying the mixture.

2. The method defined by claim 1 wherein the titanium salt is a salt of an acid that forms a volatile ammonium salt, and the base is ammonia.

References Cited in the file of this patent

UNITED STATES PATENTS

| | | |
|---|---|---|
| 2,049,359 | Dusing et al. | July 28, 1936 |
| 2,326,059 | Nordberg | Aug. 3 1943 |
| 2,757,305 | Duziergwa | July 31, 1956 |

OTHER REFERENCES

Taylor and Thompson: Concrete (3rd ed.), 1917, page 120.